March 2, 1954 G. M. KRIEGBAUM 2,670,699
TOOL LIFT AND DISPENSING MECHANISM CONTROL MEANS
Filed Dec. 22, 1948 5 Sheets-Sheet 2

Inventor:
George M. Kriegbaum
Paul O. Pippel
Atty.

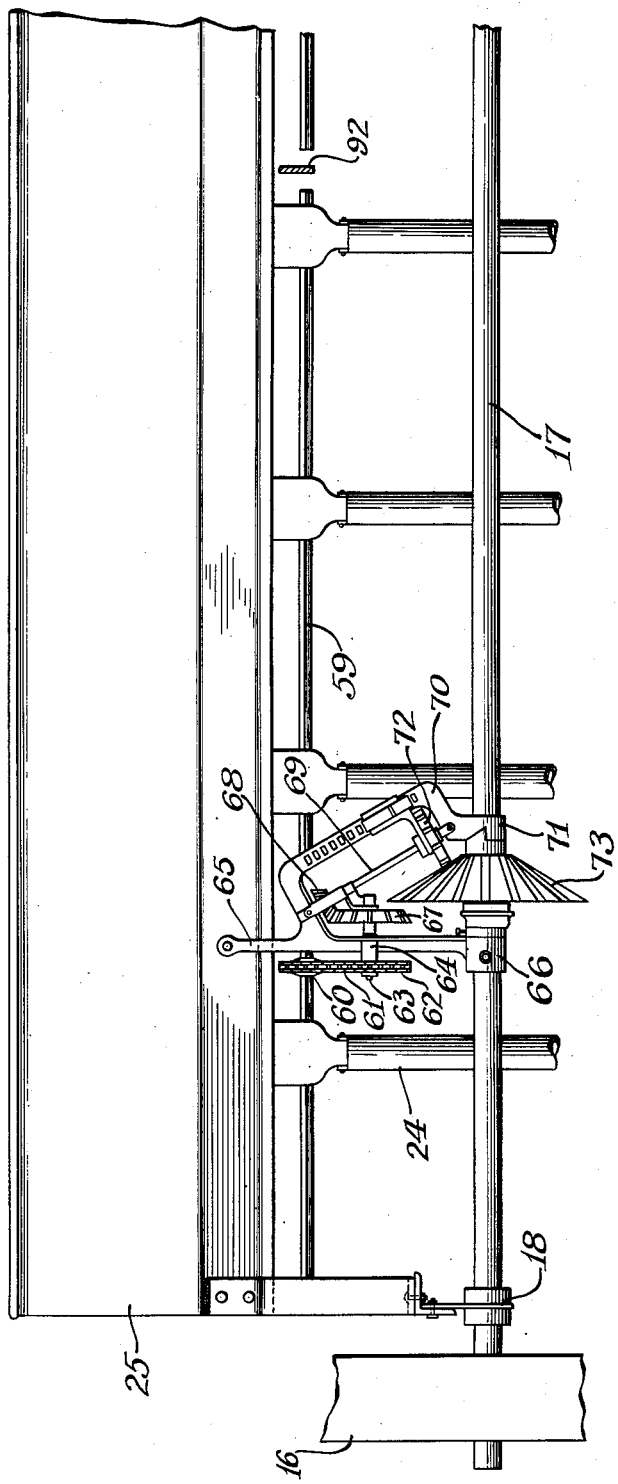

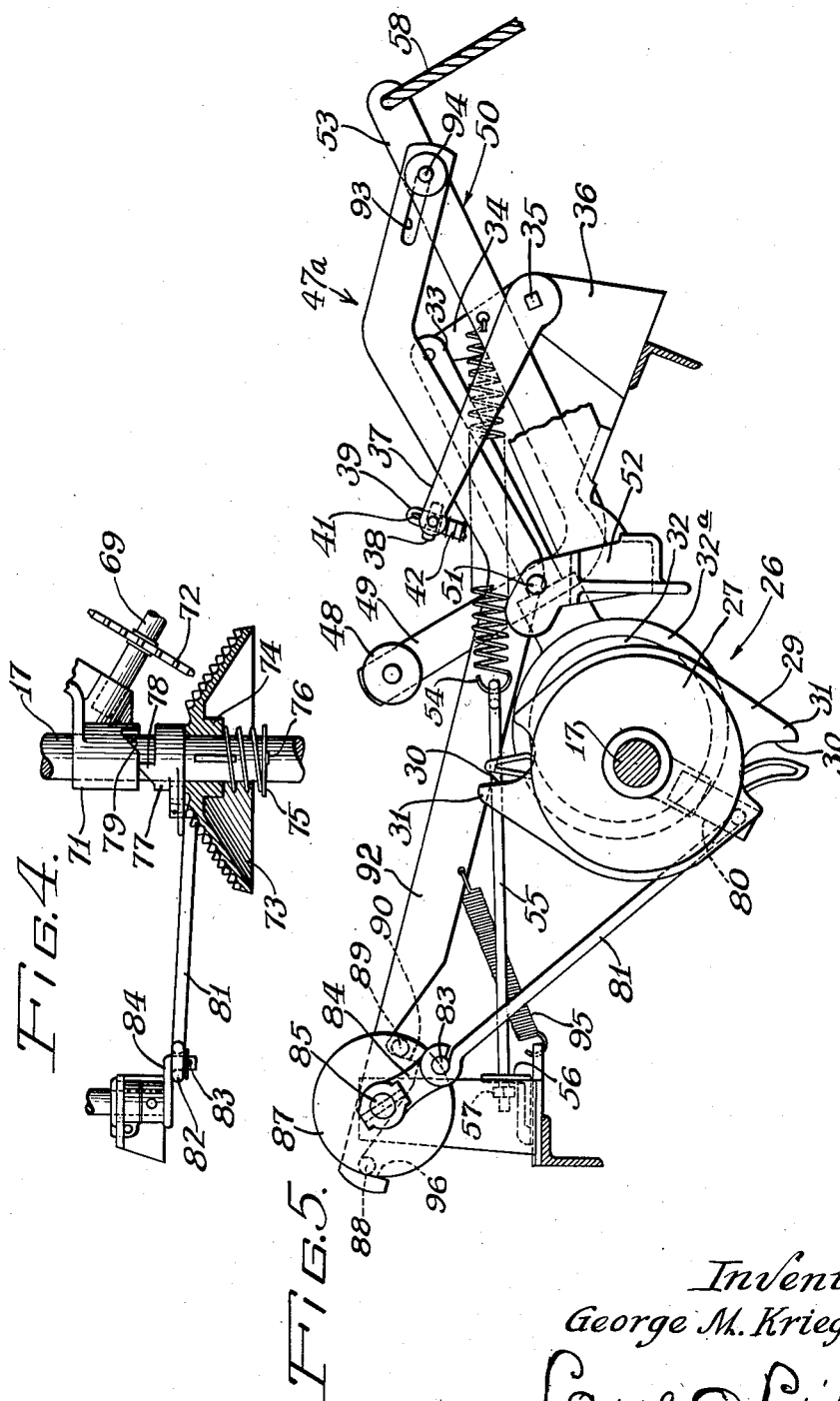

March 2, 1954 G. M. KRIEGBAUM 2,670,699
TOOL LIFT AND DISPENSING MECHANISM CONTROL MEANS
Filed Dec. 22, 1948 5 Sheets-Sheet 5
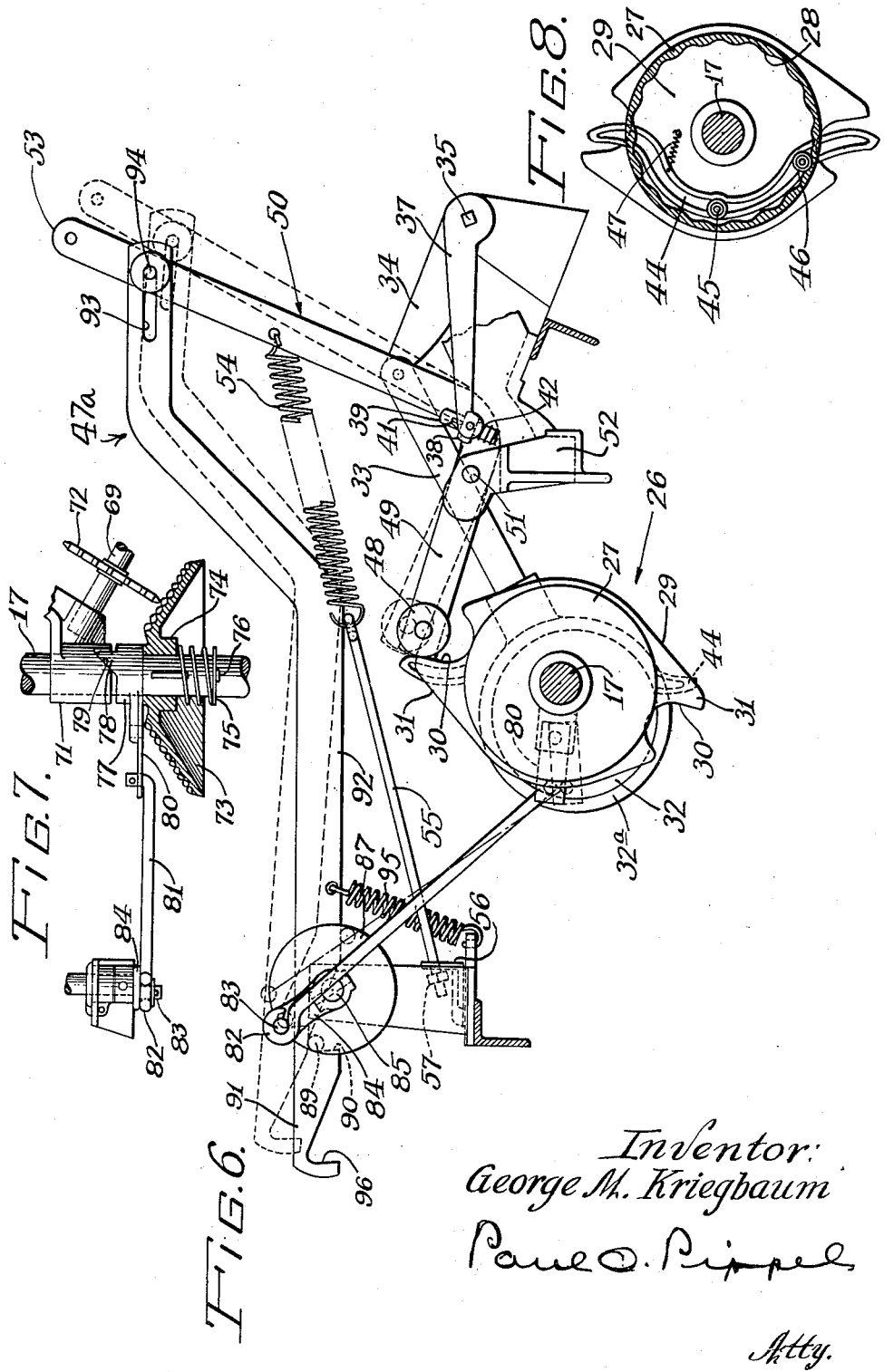
Inventor:
George M. Kriegbaum
Paul O. Pippel
Atty.

Patented Mar. 2, 1954

2,670,699

UNITED STATES PATENT OFFICE 2,670,699

TOOL LIFT AND DISPENSING MECHANISM CONTROL MEANS

George M. Kriegbaum, Homewood, Ill., assignor to International Harvester Company, a corporation of New Jersey Application December 22, 1948, Serial No. 66,625

3 Claims. (Cl. 111—67)

This invention relates to agricultural implements, and particularly to dispensing machines such as grain drills.

A conventional grain drill comprises an elongated transverse grain box supported on ground wheels and having a plurality of furrow opener units raised and lowered by power derived from the ground wheels. Customarily, when the furrow openers are raised as at the end of a field, the seed-dispensing mechanism is simultaneously thrown out of operation by simple apparatus which interconnects the power lift and the seed shaft drive. However, due to the distance seed has to travel from the grain box through the flexible tube to the furrow, the operation of seed dropping is not synchronized with the raising and lowering of the furrow openers. The result is that seed is wasted by being spread upon the surface of the ground or planting space is wasted by failure of seed to enter the furrow for some distance after the furrow openers have begun to operate.

For example, let us assume that a grain drill has reached the end of a field and is turning to open furrows going in the opposite direction. The furrow openers have been raised to transport and the seed dispensing mechanism has been put out of operation. The mechanism by which the furrow openers are lowered is now actuated and the tools quickly drop to the ground and start opening a furrow. At the same time that the lowering mechanism is actuated the dispensing mechanism is likewise actuated. However, due to frictional contact of the seed with the flexible tube through which it falls, as well as the greater length of fall compared with that of the furrow openers, a considerable length of furrow has been opened before any seed is dropped therein. The result is that a great deal of planting space is wasted.

Conversely, upon arrival of the machine at the end of the field the furrow openers are raised and the flow of seed from the seed box is stopped. However, considerable seed is already trapped in the dispensing mechanism between the grain box and the furrow opener which continues to fall after the furrow openers are out of the ground. The result is that a great deal of seed is wasted.

It is therefore an object of the present invention to obviate the foregoing difficulties and to provide improved planting mechanism designed to deposit seed and the like more efficiently and economically.

Another object of the invention is to provide in a planting machine means for actuating the dispensing mechanism prior to raising or lowering of the furrow-forming tools.

Another object of the invention is to provide in a planter such as a grain drill a common lever for operating the seed dispenser drive clutch and the control for the furrow openers, the initial movement of the lever serving to actuate the seed shaft drive clutch and further movement thereof actuating the furrow openers. The operations are so timed that when going into operating position the seed reaches the ground at approximately the same time as the furrow openers, and upon reaching the end of the row the dispensing mechanism is stopped before the furrow openers are lifted so that the last of the seed reaches the ground at approximately the same time that the furrow openers leave the ground.

Other objects and advantages of the invention will become clear from the following detailed description when read in conjunction with the accompanying drawings wherein:

Fig. 3 is a rear elevation of a portion of the structure shown in Fig. 1 and illustrating the manner in which drive is transmitted from the wheel axle to the seed shaft of the dispenser mechanism.

Fig. 4 is a detail showing the manner in which the driving of the seed shaft is interrupted when the earth working units of the grain drill are raised to inoperative position.

Fig. 5 is a partial sectional view in end elevation with parts removed for clarity illustrating the operation of the lifting mechanism for the furrow opener units and the manner in which the seed shaft is actuated to initiate or interrupt the flow of seed, the position of the parts corresponding to a raised or transport position of the earth working tools.

Fig. 6 is a view similar to Fig. 5 showing a position of the parts corresponding to an operating position of the earth working tools and illustrating the relationship of the control elements for actuating the power lift and the seed shaft.

Fig. 7 is a detail similar to Fig. 4 partly in section showing the engagement of the clutch parts transmitting power from the wheel shaft to the seed shaft.

Fig. 8 is a sectional detail showing certain details of construction of the power lift mechanism.

Figure 1:
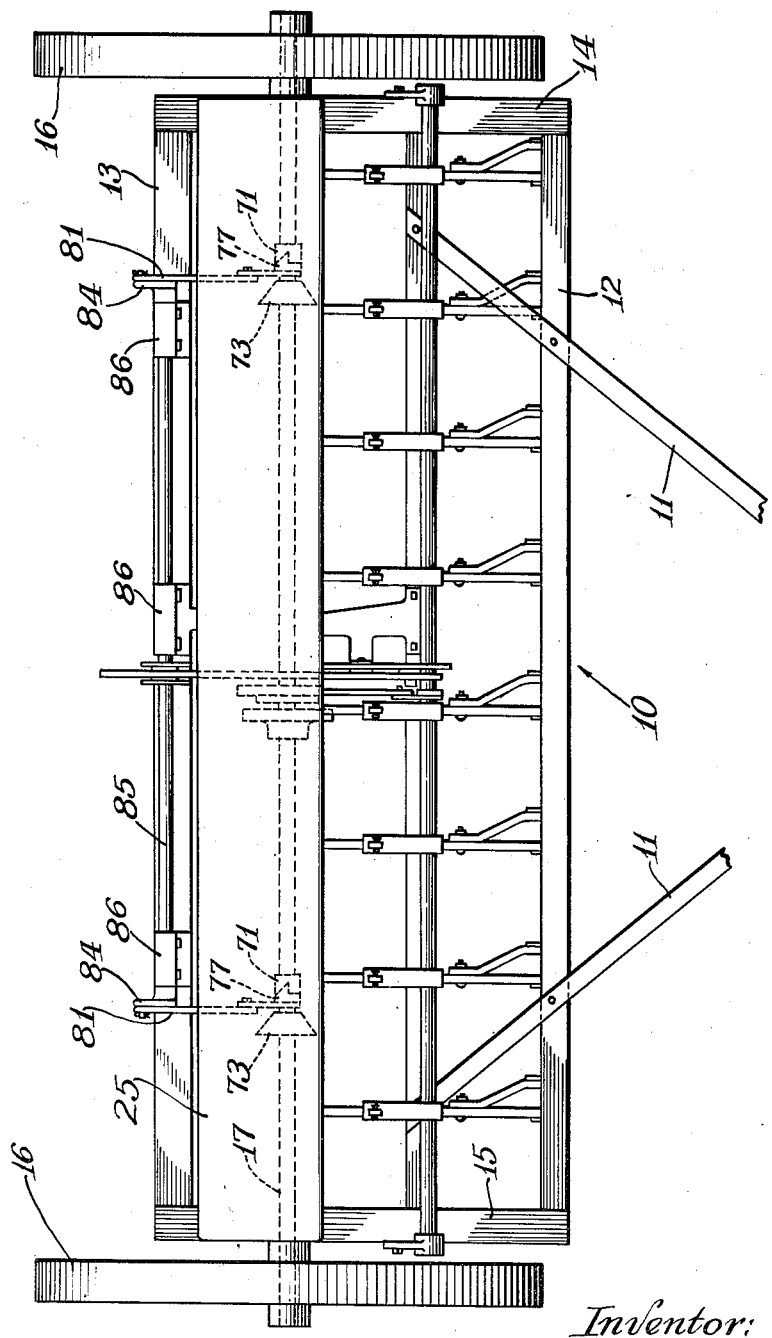
Fig. 1 is a plan view of a grain drill incorporating the features of the present invention.

Referring to the drawings, the planting mechanism incorporating the features of the present invention is a grain drill comprising a rectangular frame designated by the numeral 10 to which is secured a triangularly shaped hitch member 11 adapted to extend forwardly from the drill and to be connected in draft receiving relation to suitable propelling means such as a tractor. Frame 10 comprises a pair of longitudinally spaced transversely extending frame bars 12 and 13 in the form of angle irons connected at each end by cross bars 14 and 15. The frame is supported upon a pair of laterally spaced ground engaging wheels 16 secured to the ends of an axle 17 extending transversely of the grain drill and supported in suitable bearings carried by brackets 18, one of which is provided at each end of the frame.

A plurality of earth working units 19 are provided at laterally spaced locations on the frame. Each unit comprises a drag link 20 pivotally connected at its forward end to the front angle bar 12 of the frame. To the rear end of the drag link 20 is secured a supporting member 21 for a furrow opening tool in the form of a disk 22. Secured to the support 21 and extending downwardly alongside the disk and having an outlet near the ground is a seed boot 23 adapted to receive seed or the like dropped through a flexible tube 24 from a transversely extending seed box 25 mounted upon the grain drill frame.

It will now be clear that the grain drill is supported during operation and in transport upon the wheels 16 and that the earth working unit 19 is generally vertically movable about its pivotal connection to the frame between operating and transport positions. The furrow opening units are raised and lowered with respect to the frame by a power lift structure indicated at 26, which comprises a drum or clutch member 27 secured to the shaft 17 and constantly rotatable therewith. As shown in Fig. 8 the constantly rotatable member or drum 27 is provided interiorly upon its inner periphery with notches or grooves 28. Likewise mounted upon the shaft 17 but rotatable with respect thereto is a plate member 29 provided at opposite sides thereof 180° apart with two recesses 30, each of which is provided with an extension 31. Secured to this plate 29 is an eccentric member 32 which is rotatable with the plate 29 eccentrically to the axis of the shaft 17. Mounted upon the eccentric 32 and rotatable with respect thereto is a band 32ª having secured thereto a thrust rod 33, one end of which is pivotally connected to an arm 34 mounted upon a transversely extending rock shaft 35 carried in bearings upon lugs 36 secured to and extending upwardly from the grain drill frame. Likewise secured to the shaft 35 is a lift arm 37, one being provided for each of the furrow opener units 19 at laterally spaced locations along the rock shaft 35. Arm 37 is provided at its end with a swivel 38 in which is slidably received a lift rod 39 pivotally connected at its lower end at 40 upon the support 21. Rod 39 is prevented from displacement from the swivel 38 by a cotter key 41 and a spring 42 surrounding the rod 39 abuts the swivel at its upper end and at its lower end abuts a pin 43 which is adjustable in order to vary the tension upon the spring 42.

Figure 2:
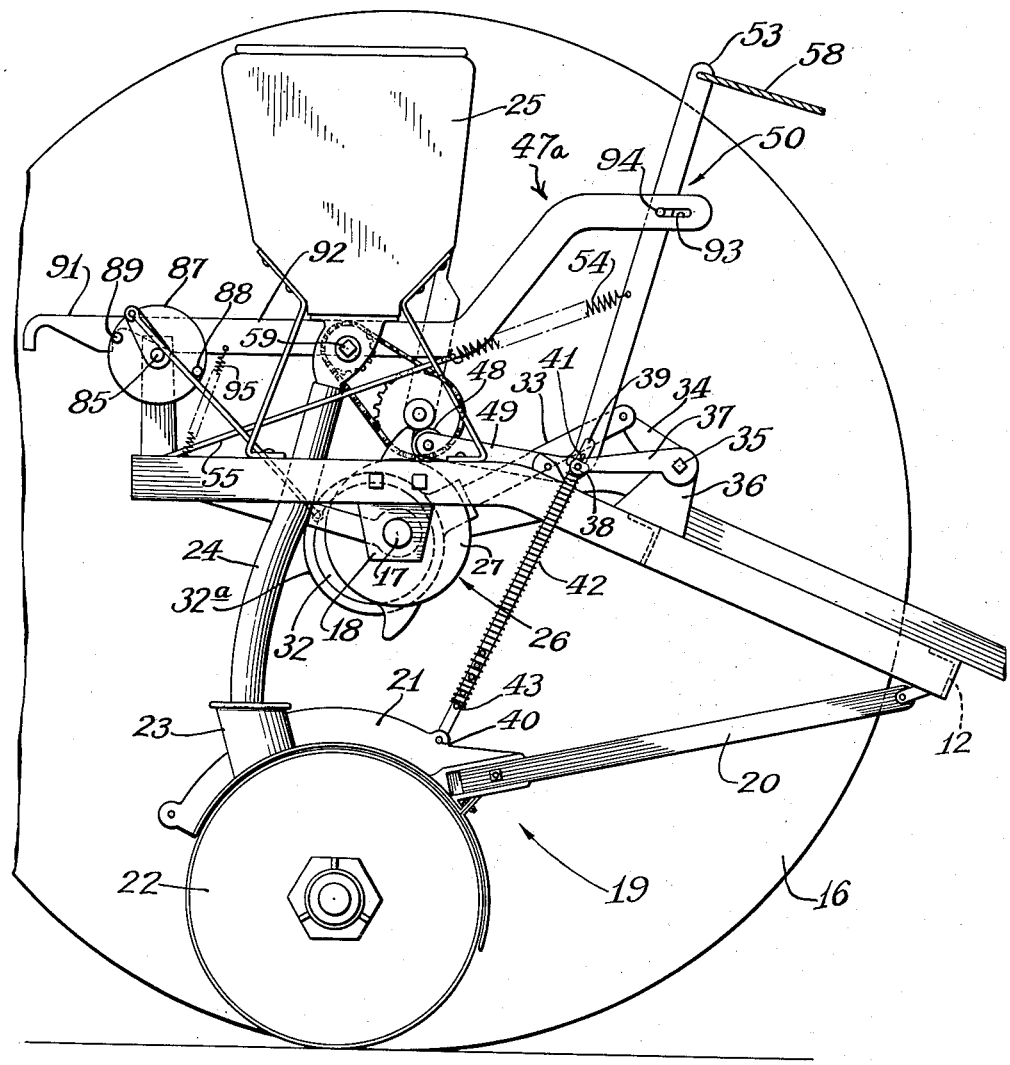
Fig. 2 is a view in end elevation, with one wheel removed for clarity, of the structure shown in Fig. 1.

Rocking of the shaft 35 and of the lift arm 37 in a clockwise direction as viewed in Fig. 2 will, of course, raise the furrow opening units 19 to a transport or inoperative position. In Fig. 2 the furrow opener unit is shown in a lowered position with the disk 22 resting upon the ground. In Fig. 2 also the position of the eccentric member 32 is indicated partly in dotted lines to show the position of the parts when the unit has been lowered. Fig. 5 shows the position of the parts with the earth working tools in raised position.

In order that the power lift mechanism 26 may be actuated as needed when the furrow openers are to be raised to transport position, as when turning at the end of a field, or when they are to be lowered into operating position when initiating a trip across the field it is necessary that the movement of the plate 29 and of the eccentric 32 to rock the shaft 35 and lift arm 37 be intermittently operable. This is accomplished by the provision of a double ended dog 44 pivotally mounted at 45 upon the plate member 29 and having mounted upon one arm thereof a roller 46. Roller 46 is engageable with one of the grooves 28 on the inner periphery of drum 27 and is urged into that position by means of a spring 47 anchored to one arm of the dog and to the plate member 29. When the roller 46 is seated in one of the grooves 28 of the drum, plate member 29 and its eccentric portion 32 rotate with the drum to rock the rock shaft 35 and raise or lower the earth working units 19.

The roller 46 is normally held out of engagement with the grooves 28 by control mechanism generally indicated at 47ª which includes a roller 48 mounted upon one arm 49 of a lever 50 pivoted at 51 upon a bracket 52 secured to the grain drill frame and having an upwardly extending control arm 53. Lever or control member 50 is biased to a position in which roller 48 is seated in recess 30 against the projection 31 by a spring 54 anchored to the lever portion 53 at one end and at its other end to a rod 55 slidably receivable in an aperture formed in a lug 56 carried by the frame. Rod 55 is threaded at its end to receive a nut 57 by which the tension upon the spring 54 may be adjusted as desired.

When the roller 48 is seated in the recess 30 the end of dog 44 is engaged and roller 46 moves out of contact with the grooves 28 against the action of the spring 47. In this position of the parts the plate 29 and eccentric 32 do not rotate and only drum 27 is driven with the shaft or axle 17. Lever 53 is rocked in a clockwise direction as viewed for example in Fig. 2 by means of a rope 58 which extends forwardly to a position near the operator of the tractor or vehicle by which the implement is drawn. The operator pulls upon the rope 58 when it is desired to raise or lower the furrow opening tools, control member 50 rocks clockwise about its pivot 51, roller 48 is unseated from recess 30, and spring 47 urges roller 46 into engagement with one of the grooves 28 of drum 27. Plate member 29 and eccentric 32 then revolve within the band 32ª roller 48 riding upon the outer edge of the plate 29 until a half revolution thereof has been completed. The operator having released the rope 58 roller 48 is urged into the opposite recess 30 of the plate. When it is desired to again raise or lower the tools this operation is repeated.

As previously pointed out, when initiating a planting operation at the edge of a field the earth working tools are lowered to operating position to begin the opening of a furrow for the deposition of seed. With conventional equipment it is customary to actuate the seed dispensing mechanism simultaneously with the movement of the earth working tools as they are lowered. Since the seed has a considerable distance to travel from the seed box 25 to the lower earth penetrating edge of the disk or disks 22, and further, since the seed encounters frictional resistance against the sides of the flexible tube 24 and of the boot 23, the disk is already in the ground and has formed a furrow for some distance before the seed reaches the furrow. It is therefore important to avoid this waste planting space and have the seed begin to drop into the furrow at the moment the furrow is opened. Likewise, upon reaching the end of the field in the case of conventional equipment the seed dispensing mechanism is shut off at the time the furrow openers are raised and seed dropped between the seed box and the base of the seed boot is spread upon the surface of the ground. These difficulties are overcome by mechanism now to be described.

It may be noted, for example in Fig. 3, that the seed shaft 59 extends transversely of the machine and serves to operate, in a manner well-known in machines of this type, mechanism by which seed is passed from the box 25 into the tubes 24. As indicated in Fig. 3 shaft 59 is divided into two parts for a reason which will hereinafter become clear. Each part 59 of the seed shaft is driven from the wheel shaft 17 by mechanism which includes a sprocket wheel 60 mounted upon the shaft 59 and drivingly connected by a chain 61 with a sprocket wheel 62 mounted upon a shaft 63 journalled in a bearing 64 carried by a bracket 65 secured at its upper end to the grain box and provided at its lower end with a bearing 66 mounted upon the shaft 17. Also mounted upon shaft 63 is a bevel gear 67 meshing with a gear 68 mounted upon a shaft 69 carried in bearings secured to a bracket 70 connected at one end to the member 65 and provided at its other end with a bearing 71 mounted upon the shaft 17. The lower end of shaft 69 has mounted thereupon a gear 72 adapted to mesh with a bevel gear 73 splined upon the shaft 17 for axial movement therealong.

As will be observed in Figs. 4 and 7, gear 73 is frusto-conical in shape and is provided with a hub 74 which engages a spring 75 surrounding shaft 17 and abutting at its other end a cotter 76 carried by the shaft. Spring 75 urges gear 73 axially against a cam member 77 rockably mounted upon the shaft 17 and provided with a tooth 78 engageable with a recess 79 in the bearing 71. It will thus be clear that by rotation of the cam member 77 with respect to the shaft 17 and with respect to the bearing 71 the cam member 77 will move axially away from the bearing 71 and therefore will move gear 73 axially against the action of the spring 75 and away from engagement with the gear 72, thus interrupting the transmission of drive motion from axle 17 to the seed shaft 59.

Rocking of the cam 77 to move gears 72 and 73 into or out of engagement for interrupting and restoring the operation of the seeding mechanism is accomplished by means which includes an arm 80 extending radially from the cam member 77 and having pivotally connected thereto a link 81 provided at its other end with an eye 82 adapted to receive the pin 83 of a crank 84 affixed to a shaft 85 which extends transversely of the grain drill frame and is carried in laterally spaced bearings 86. A crank 84 is provided at each end of the shaft 85, as will be observed from a study of Fig. 1, to throw in and out the driving mechanism for each section of the seed shaft 59.

Centrally of the shaft 85 there is secured thereto a disk 87 having mounted thereupon pins 88 and 89. As will be noted in Fig. 6 when the tools are in operating position the pin 89 is engageable with a notch 90 in the pawl portion 91 of a link member 92 forming a part of the control means 47a. The other end of link 92 is provided with a slot 93 adapted to receive a pin 94 carried by the lever arm 53. It should thus be clear that upon movement of the lever 50 in a clockwise direction to actuate the power lift, pin 94 will engage the end of the slot 93 and link 92 will be moved forwardly. By virtue of the engagement of the pin 89 of the disk 87 in notch 90 of the link 92 the disk will be rotated in a clockwise direction as viewed in Fig. 6, for example. Assuming that it is desired to raise the implement from the operating position shown in Fig. 6 to the raised position shown in Fig. 5 arm 53 is moved forward causing rotation of disk 87. Pin 89 is maintained in notch 90 by provision of a spring 95 shown in Fig. 5 which is anchored to the rear portion of the grain drill frame 10 at one end and at its other end to the link 92. As soon as disk 87 begins to rotate cam member 77 is likewise rocked on the shaft 17 to move the gears 72 and 73 out of engagement, thus interrupting the operation of the seed shaft 59 and stopping the flow of seed from the box 25. By the time the link 92 has moved part of its stroke to the dotted line position indicated in Fig. 6 the roller 48 has likewise moved in recess 30 to the dotted line position indicated and is still in engagement with the end of the dog 44 holding the roller 46 out of engagement with notch 28 of drum member 27. It should be pointed out that link 92 extends longitudinally from a location in advance of the grain box to a location rearwardly thereof and occupies the space between the inner ends of the two seed shafts 59 as indicated in Fig. 3. The throwing of the seed shaft driving mechanism in and out of operation therefore to interrupt or restore the dispensation of seed is begun before plate 29 and cam 30 begin to rotate to initiate the vertical movement of the earth working tools. Thus, if the power lift is being actuated to lower the tools to working position the seed is allowed plenty of time and the arrangement and proportions of the control parts are so selected that the seed has arrived at the furrow opener disk and is dropped into the furrow at the moment that the furrow is opened.

The forward stroke of lever arm 53 and of link 92 causes rotation of the disk 87 to the position indicated in Fig. 5 when the members are raised to transport position. In the position of Fig. 5 lever 53 has completed its stroke, pin 88 has moved into the notch 96 and pin 89 is retained in notch 90. Upon release of the lever 53 by the operator the link 92 is returned to the position shown in Fig. 6.

It is believed that the operation of the planting mechanism herein described should be clearly understood. It should likewise be understood that modifications may be made in the invention without departing from the spirit thereof or the scope of the appended claims.

What is claimed is:

1. In a planter including a frame, seed dispensing mechanism on the frame, clutch means for interrupting and restoring the operation of the seed dispensing mechanism, a furrow forming tool mounted on the frame for movement between operating and transport positions and lift means for raising and lowering the tool, a single control member on the frame operatively connected to and movable to actuate the lift means, and an operating connection between the control member and said clutch means, said control member being effective in the first part of a stroke of movement in one direction to actuate the clutch means and in the second part of said stroke to actuate the lift means to raise the tool to transport, and said control member also being effective when the tool is raised to actuate the clutch means in the first part of a similar stroke of movement in said one direction and in the second part of said last mentioned stroke to actuate the lift means to lower the tool.

2. In a planter including a wheel supported frame, a driven shaft journaled on said frame, furrow opening tools mounted on said frame, power lift means mounted on the shaft and connected to said tools for movement thereof between operating and transport positions and seed dispensing mechanism for feeding seed to the furrows formed by the furrow opening tools, means for driving the seed dispensing mechanism from said shaft comprising relatively movable gears on the shaft for transmitting drive from the shaft to the seed dispensing mechanism, common control means mounted on the frame operable to actuate the lift means and to move said gears into and out of engagement, said control means comprising a lever pivoted on the frame and operatively connected to the power lift to actuate the latter and means comprising a link operatively connecting said lever to said relatively movable gears to move the latter into and out of engagement, said lever being operable in the first range of a stroke of movement thereof in one direction to move said gears and in a succeeding range of said stroke of movement to actuate said power lift, whereby the seed dispensing mechanism and the power lift are actuated in succession.

3. In a planter including a wheel supported frame, a driven shaft journaled on said frame, furrow opening tools mounted on said frame, power lift means mounted on the shaft and connected to said tools for movement thereof between operating and transport positions and seed dispensing mechanism for feeding seed to the furrows formed by the furrow opening tools, means for driving the seed dispensing mechanism from said shaft comprising relatively movable gears on the shaft for transmitting drive from the shaft to the seed dispensing mechanism, a cam member on the shaft operable to move said gears into and out of engagement, a lever pivoted on the frame operatively connected to the power lift to actuate the latter and means comprising a link operatively connecting said lever to said cam member to actuate the latter, said lever being operable in the first range of a stroke of movement thereof in one direction to actuate said cam and in a succeeding range of said stroke of movement to actuate the power lift, whereby the seed dispensing mechanism and the power lift are actuated in succession.

GEORGE M. KRIEGBAUM.

References Cited in the file of this patent

UNITED STATES PATENTS

| Number | Name | Date |
|---|---|---|
| Re. 6,274 | Patric | Feb. 2, 1875 |
| 7,268 | Peirson | Apr. 9, 1850 |
| 304,830 | Koble | Sept. 9, 1884 |
| 543,049 | Patric | July 23, 1895 |
| 816,331 | Jones et al. | Mar. 27, 1906 |
| 1,476,728 | Roby | Dec. 11, 1923 |
| 1,842,059 | Alegria | Jan. 19, 1932 |
| 1,968,187 | White | July 31, 1934 |
| 2,031,650 | Hendricks et al. | Feb. 25, 1936 |
| 2,189,185 | Thompson | Feb. 6, 1940 |
| 2,223,624 | Krause | Dec. 3, 1940 |
| 2,336,099 | Hyland | Dec. 7, 1943 |
| 2,396,980 | Blue | Mar. 19, 1946 |